United States Patent Office 3,435,055
Patented Mar. 25, 1969

3,435,055
7-METHYLESTR-2-EN-17-ONE AND DERIVATIVES THEREOF
Paul D. Klimstra, North Brook, Ill., assignor to G. D. Searle & Co., Chicago, Ill., a corporation of Delaware
No Drawing. Filed Sept. 23, 1966, Ser. No. 581,430
Int. Cl. C07c *169/08, 169/10;* A61k *27/00*
U.S. Cl. 260—397.3     11 Claims The present invention is concerned with novel estrene derivatives characterized by a 7-methyl-$\Delta^2$ structure and, more particularly, with 7-methylestr-2-en-17-one and derivatives thereof. Those novel compounds are represented by the following structural formulas

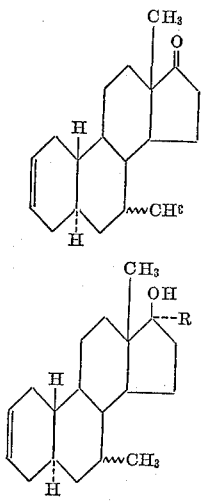

together with the corresponding 17-(lower alkanoates), wherein R is selected from the group consisting of hydrogen and a lower alkyl radical and the wavy line indicates that the stereochemical configuration of the 7-methyl substituent is optionally α or β.

The lower alkyl radicals encompassed by the R term are exemplified by methyl, ethyl, propyl, butyl, pentyl, hexyl, heptyl, and the branched-chain radicals thereof.

Typical of the 17-(lower alkanoates) of the present invention are the formate, acetate, propionate, butyrate, valerate, caproate, heptanoate, and the corresponding branched-chain esters.

The compounds of this invention are useful as a result of their valuable pharmacological properties. They are hormonal agents, for example, as is evidenced by their anabolic, androgenic and estrogenic properties. They possess also the particular advantage of lacking antiestrogenic side effects.

Starting materials suitable for use in the manufacture of the instant compounds are those represented by the following structural formula

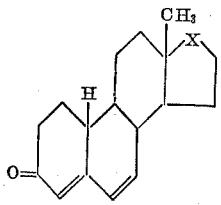

wherein X can be a carbonyl, β-hydroxymethylene or α-(lower alkyl)-β-hydroxymethylene group. The addition to those materials of methyl magnesium bromide in the presence of cuprous chloride followed by decomposition of the Grignard adduct affords the corresponding 7-methyl derivative, which is a mixture of the 7α and 7β epimers. Those epimeric mixtures can be used as such or, alternatively, can be separated into the individual isomers. That separation is conveniently effected by dehydrogenating the mixture by means of chloranil, thus converting the 7β isomer to the corresponding 6-dehydro compound while the 7α isomer remains unaffected. The 6-dehydro-7-methyl derivative is then reduced with an alkali metal and liquid ammonia to regenerate the pure 7β-methyl isomer. Those processes are specifically illustrated by the reaction of 17β-hydroxyestra-4,6-dien-3-one with methyl magnesium bromide in the presence of cuprous chloride to afford 17β-hydroxy-7-methylestr-4-en-3-one, dehydrogenation of that epimeric mixture by reaction with chloranil to yield 17β-hydroxy-7α-methylestr-4-en-3-one together with 17β - hydroxy - 7 - methylestr-4,6-dien-3-one, separation of the latter mixture by chromatography followed by regeneration of 17β-hydroxy - 7β - methylestr-4-en-3-one, from 17β-hydroxy-7-methylestr-4,6-dien-3-one, utilizing lithium and liquid ammonia.

The latter 7-methyl-3-keto-$\Delta^4$ intermediates are converted to the compounds of the present invention by a series of reactions involving reduction of the 3-keto and $\Delta^4$ moieties, either concomitantly or consecutively, conversion of the resulting 3β-hydroxy group to a suitable ester and heating of that ester in a suitable organic base to generate the $\Delta^2$ double bond. When the 7-methyl intermediate possesses a secondary hydroxy group at the 17 position, that moiety is first protected, conveniently by a tetrahydropyran-2-yl ether group. As a specific example of those processes, 17β-hydroxy-7-methylestr-4-en-3-one is contacted with dihydropyran in the presence of a suitable acid catalyst to yield the corresponding 17-tetrahydropyran-2-yl ether, which is reduced with lithium-liquid ammonia to yield 7-methyl-5α-estrane-3β,17β-diol 17-tetrahydropyran-2-yl ether. The 3-hydroxy group of the latter intermediates is then acylated, typically with a sulfonyl acid halide such as p-toluenesulfonyl chloride, and the resulting 3-p-toluenesulfonates are heated with an organic base such as collidine to yield the corresponding $\Delta^2$ compound. Removal of the tetrahydropyran-2-yl protecting group is readily effected by heating with an acidic reagent such as p-toluenesulfonic acid. The aforementioned 7-methyl-5α-estrane-3β,17β-diol 17-tetrahydropyran-2-yl ether is thus allowed to react with p-toluenesulfonyl chloride in pyridine to yield the corresponding 3-p-toluenesulfonate, which is heated in collidine at reflux temperature to produce 7-methyl-5α-estr-2-en-17β-ol 17-tetrahydropyran-2-yl ether. Heating of the latter ether with p-toluenesulfonic acid and methanol effects removal of the tetrahydropyran-2-yl protecting group, thus affording 7-methyl-5α-estr-2-en-17β-ol.

The 7-methyl-5α-estran-3β-ol intermediates are alternatively produced from the 7-methylestr-4-en-3-one starting materials by step-wise reduction of the 3-keto and $\Delta^4$ functions. Selective reduction of the 3-keto group is effected by a metallic chemical reducing agent such as lithium aluminum hydride, sodium borohydride, lithium tri-(tertiary-butoxy) aluminum hydride or diisobutyl aluminum hydride, while the Δ⁴ double bond is preferentially reduced by means of catalytic hydrogenation, utilizing a suitable catalyst as typified by palladium. The successive application of these selective reduction processes results in the desired intermediates.

An alternate method for manufacture of the instant 17-alkyl derivatives involves reaction of the corresponding 17-keto compound with an alkyl organometallic reagent. 7-methyl-5α-estr-2-en-17-one is thus contacted with ethereal methyl magnesium bromide and the resulting adduct decomposed with aqueous ammonium chloride to yield, 7,17α-dimethyl-5α-estr-17β-ol.

The instant compounds containing a secondary 17-hydroxy group are readily converted to the corresponding 17-keto substances by means of a suitable oxidizing agent such as hexavalent chromium. 7-methyl-5α-estr-2-en-17β-ol, when contacted with chromic acid in aqueous acetone, thus affords 7-methyl-5α-estr-2-en-17-one. The 17-keto derivatives, on the other hand, are converted to the corresponding 17β-ols by reduction with a metallic hydride such as sodium borohydride, lithium aluminum hydride or lithium tri-(tertiary-butoxy) aluminum hydride.

Another alternate route to the instant 17-keto compounds involves selective formation of the 17-cyanohydrin of a 7-methylestr-4-ene-3,17-dione followed by acylation of the resulting 17-hydroxy group, reduction of the 3-keto group, alkaline cleavage of the acylated cyanohydrin to regenerate the 17-keto group and conversion of the 3β-hydroxy to the corresponding Δ² structure by the procedure described hereinbefore. A specific example of those processes is the reaction of 7-methylestr-4-ene-3,17-dione with acetone cyanohydrin in the presence of a catalytic quantity of triethylamine to afford 17-cyano-17-hydroxy-7-methylestr-4-en-3-one, acylation of that substance with acetic anhydride in pyridine to afford the corresponding 17-acetate, reduction of the 3-keto group by means of lithium tri-(tertiary-butoxy) aluminum hydride to afford 17-cyano-7-methylestr-4-en-3β,17β-diol 17-acetate, cleavage of the acylated cyanohydrin function with aqueous potassium hydroxide in methanol to afford 3β-hydroxy-7-methylestr-4-en-17-one followed by reduction of the Δ⁴ double bond, conversion to the 3β-p-toluenesulfonate, and pyrolysis of that ester by the processes described hereinbefore, thus producing 7-methyl-5α-estr-2-en-17-one.

The 17-(lower alkanoates) of this invention are obtained by reaction of the corresponding 17β-ol with a lower alkanoic acid anhydride or halide, preferably in the presence of a suitable acid acceptor. When the 17-hydroxy group is secondary, the reaction is conveniently conducted at room temperature, but higher temperatures are required to acylate the tertiary hydroxy group. 7-methylestr-2-en-17β-ol is thus allowed to react with acetic anhydride and pyridine at room temperature to afford the corresponding 17-acetate.

As is discussed hereinbefore, the starting materials for manufacture of the instant compounds are, alternatively, epimeric mixtures of the 7α- and 7β-methyl compounds or the individual pure epimers themselves. The instant compounds are thus obtained, as desired, in the form either of the corresponding epimeric mixtures or of the pure 7α- or 7β-methyl derivatives.

The invention will appear more fully from the examples which follow. These examples are set forth by way of illustration only, and it will be understood that the invention is not to be construed as limited either in spirit or in scope by the details contained therein as many modifications both in materials and methods will be apparent from this disclosure to those skilled in the art. In these examples, temperatures are given in degrees Centigrade (° C.). Quantities of materials are expressed in parts by weight unless otherwise noted.

EXAMPLE 1

To a solution of 9 parts of 17β-hydroxy-7-methylestr-4-en-3-one in 100 parts of methylene chloride is added 10 parts of dihydropyran and 0.02 part of p-toluenesulfonic acid monohydrate. The resulting reaction mixture is stored at room temperature for about 48 hours, following which time a small quantity of pyridine is added and the solvent is removed by distillation under reduced pressure. The resulting oily residue, amounting to 11 parts and containing 17β-hydroxy-7-methylestr-4-en-3-one 17-tetrahydropyran-2-yl ether, is dissolved in 157 parts of tetrahydrofuran. That solution is added to a mixture containing 315 parts of liquid ammonia and 90 parts of tetrahydrofuran, following which time 2 parts of lithium metal is added in small portions with stirring over a period of about 15 minutes. 24 parts of isopropyl alcohol is then added. The solution becomes colorless after stirring for about 10 minutes. An additional 1 part of lithium metal followed by 24 parts of isopropyl alcohol is then added, and the solution is stirred for approximately 30 minutes. The excess reagent is destroyed by the addition of methanol, and the ammonia is allowed to evaporate at room temperature. The residual mixture is poured into water, then is extracted with ether. The organic layer is separated, washed with water, dried over anhydrous sodium sulfate containing decolorizing carbon, then stripped of solvent by distillation under reduced pressure. Chromatography of the oily residue on silica followed by elution with 5% ethyl acetate in benzene affords 7-methyl-5α-estrane - 3β,17β - diol 17-tetradropyran-2-yl ether as an oil. Infrared absorption maxima are observed, in chloroform, at about 2.75, 3.40, 8.79, and 9.68 microns.

EXAMPLE 2

To a solution of 5.5 parts of 7-methyl-5α-estrane-3β,17β-diol 17-tetrahydropyran-2-yl ether in 50 parts of pyridine is added 5.5 parts of p-toluenesulfonyl chloride, and the resulting mixture is stored at room temperature for about 2½ hours, then is poured carefully into water. The resulting precipitate is collected by filtration, washed on the filter with water, then purified by recrystallization first from aqueous acetone, then from acetone to produce 7 - methyl - 5α - estrane-3β,17β-diol 3-p-toluenesulfonate, 17-tetrahydropyran-2-yl ether, melting at about 151–153° with decomposition. This compound displays an optical rotation, in chloroform, of —15°.

EXAMPLE 3

The reduction of an equivalent quantity of 7-methylestr - 4 - ene-3,17 - dione or 17β-hydroxy-7,17α-dimethylestr-4-en-3-one by the process described in Example 1 results in 7-methyl-5α-estrane-3β-diol and 7,17α-dimethyl-5α-estrane-3β,17β-diol, respectively.

EXAMPLE 4

A solution containing 2 parts of 7-methyl-5α-estrane-3β,17b-diol 3-p-toluenesulfonate, 17-tetrahydropyran-2-yl ether in 47 parts of colldine is heated at the reflux temperature for about 3 hours, then is cooled and poured into a mixture containing excess 10% aqueous sulfuric acid and ice. The resulting aqueous mixture is extracted with ether, and the organic layer is separated, washed with water, dried over anhydrous sodium sulfate containing decolorizing carbon and stripped of solvent by distillation under reduced pressure to afford an oily residue, which solidifies upon standing. That residue, containing 7-methyl-5α-estr-2-en-17β-ol 17-tetrahydropyran-2-yl ether, is dissolved in 20 parts of methanol, and 0.3 part of p-toluenesulfonic acid monohydrate is added. The resulting reaction mixture is heated on a steam bath for several minutes, then is diluted with water and extracted with ether. The ether layer is separated, washed successively with water and 5% aqueous sodium bicarbonate, then dried over anhydrous sodium sulfate containing decolorizing carbon. The solvent is removed by distillation under reduced pressure, and the initially oily residue solidifies upon standing, then is purified by recrystallization from aqueous methanol to yield pure 7-methyl-5α-estr-2-en-17β-ol, which melts at about 114–116°. This compound displays an optical rotation of +47.5° in chloroform and is characterized further by the following structural formula

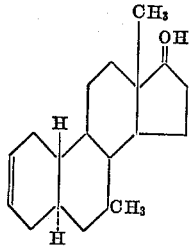

EXAMPLE 5

To a solution of 5 parts of 7-methyl-5α-estr-2-en-17β-ol in 80 parts of acetone is added an aqueous solution, 8 N in chromium trioxide and 8 N in sulfuric acid, until an excess of the reagent is present. The excess oxidant is destroyed by addition of a small quantity of isopropyl alcohol, and the mixture is then diluted with water and concentrated under reduced pressure to approximately ⅓ of the original volume. That concentrated mixture is diluted with water and cooled. The precipitate which forms is collected by filtration, washed on the filter with water, dried in air and recrystallized from aqueous methanol to afford needle-like cylindrical crystals of 7-methyl-5α-estr-2-en-17-one, melting at about 118–120°. It exhibits an optical rotation of +121° in chloroform and is represented by the following structural formula

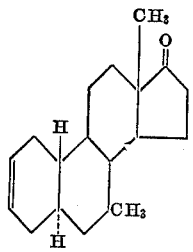

EXAMPLE 6

To a solution of 4 parts of 7-methyl-5α-estr-2-en-17-one in 140 parts of ether is added 100 parts by volume of 3 Methereal methyl magnesium bromide with stirring over a period of about 16 hours. At the end of that time the reaction mixture is poured into excess saturated aqueous ammonium chloride, and the aqueous mixture is extracted with ether. Washing of that ether extract successively with 5% hydrochloric acid and 5% aqueous sodium bicarbonate followed by drying over anhydrous sodium sulfate containing decolorizing carbon and removal of the solvent by distillation under reduced pressure affords a solid residue. Recrystallization of that crude product from aqueous methanol yields pure 7,17α-dimethyl-5α-estr-2-en-17β-ol, melting at about 122–123.5°. This compound possesses an optical rotation of +28° in chloroform and is further described by the following structural formula

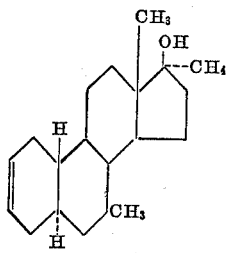

EXAMPLE 7

When an equivalent quantity of 17α-ethyl-17β-hydroxy-7-methylestr-4-en-3-one is reduced by the procedure described in Example 1, there is obtained 17α-ethyl-7-methyl-5α-estrane-3,17β-diol.

The substitution of an equivalent quantity of 17α-ethyl-7-methyl-5α-estrane-3β,17β-diol in the procedure of Example 2 results in 17α-ethyl-7-methyl-5α-estrane-3β,17β-diol 3-p-toluensulfonate.

By substituting an equivalent quantity of 17α-ethyl-7-methyl-5α-estrane-3β,17β-diol 3-p-toluenesulfonate in the procedure of Example 4, there is produced 17α-ethyl-7-methyl-5α-estr-2-en-17β-ol.

EXAMPLE 8

The reduction of an equivalent quantity of 17β-hydroxy-7α-methylestr-4-en-3-one or 17β-hydroxy-7β-methylestr-4-en-3-one according to the procedure of Example 1 results in 7α-methyl-5α-estrane-3β,17β-diol and 7β-methyl-5α-estrane-3β,17β-diol, respectively.

When an equivalent quantity of 7α-methyl-5α-estrane-3β,17β-diol or 7β-methyl-5α-estrane-3β,17β-diol is subjected to the successive processes of Examples 2 and 4, there are produced 7α-methyl-5α-estr-2-en-17β-ol and 7β-methyl-5α-estr-2-en-17β-ol.

EXAMPLE 9

When an equivalent quantity of 7α-methyl-5α-estr-2-en-17β-ol or 7β-methyl-5α-estr-2-en-17β-ol is substituted in the procedure of Example 5, there are produced 7α-methyl-5α-estr-2-en-17-one and 7β-methyl-5α-ester-2-en-17-one, respectively.

EXAMPLE 10

The substitution of an equivalent quantity of 7α-methyl-5α-estr-2-en-17-one or 7β-methyl-5α-estr-2-en-17-one in the procedure of Example 6 results in 7α,17α-dimethyl-5α-ester-2-en-17β-ol and 7β,17α-dimethyl-5α-estr-2-en-17β-ol, respectively.

EXAMPLE 11

A mixture of 2.5 parts of 7-methyl-5α-estr-2-en-17β-ol, 2.5 parts of acetic anhydride and 15 parts of pyridine is stored at room temperature for about 4 hours, then is poured slowly into a mixture of ice and water. The resulting aqueous mixture is extratced with benzene, and the benzene layer is separated, washed successively with dilute hydrochloric acid and water, then dried over anhydrous sodium sulfate containing decolorizing carbon and stripped of solvent under reduced pressure to afford 7-methyl-5α-estr-2-en-17β-ol 17-acetate, characterized by the following structural formula

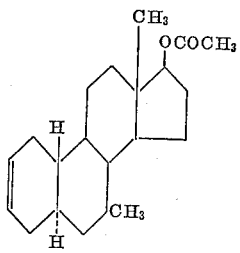

EXAMPLE 12

When an equivalent quantity of propionic anhydride is substituted in the procedure of Example 11, there is produced 7-methyl-5α-estr-2-en-17β-ol 17-propionate.

EXAMPLE 13

When an equivalent quantity of 7,17α-dimethyl-5α-estr-2-en-17β-ol is substituted in the procedure of Example 11, and the mixture is heated at about 100° for about 12 hours, there is produced 7,17α-dimethyl-5α-estr-2-en-17β-ol 17-acetate.

What is claimed is:

1. A member selected from the group consisting of compounds of the formulas

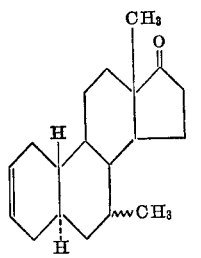

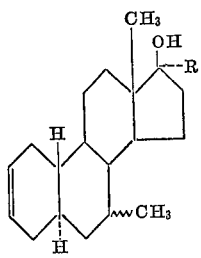

together with the 17-(lower alkanoates) thereof, wherein R is a member of the class consisting of hydrogen and a lower alkyl radical.

2. As in claim 1, a compound of the formula

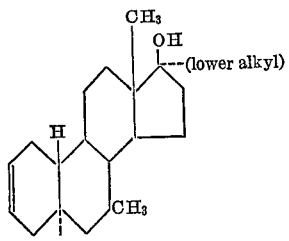

3. As in claim 1, the compound which is 7-methyl-5α-estr-2-en-17β-ol.
4. As in claim 1, the compound which is 7-methyl-5α-estr-2-en-17-one.
5. As in claim 1, the compound which is 7,17α-dimethyl-5α-estr-2-en-17β-ol.
6. As in claim 1, the compound which is 7α-methyl-5α-estr-2-en-17β-ol.
7. As in claim 1, the compound which is 7β-methyl-5α-estr-2-en-17-ol.
8. As in claim 1, the compound which is 7α-methyl-5α-estr-2-en-17-one.
9. As in claim 1, the compound which is 7β-methyl-5α-estr-2-en-17-one.
10. As in claim 1, the compound which is 7α,17α-dimethyl-5α-estr-2-en-17β-ol.
11. As in claim 1, the compound which is 7β,17α-dimethyl-5α-estr-2-en-17β-ol.

References Cited

UNITED STATES PATENTS 3,239,542   3/1966   Bowers et al.

HENRY A. FRENCH, *Primary Examiner.*

U.S. Cl. X.R.

260—397.5, 239.55